United States Patent
Peto (10) Patent No.: US 8,736,210 B2
(45) Date of Patent: May 27, 2014

(54) APPARATUS AND METHOD FOR DETERMINING SPEED OF AN INDUCTION MOTOR

(76) Inventor: Raymond John Peto, Dorchester (GB)

(*) Notice: Subject to any disclaimer, the term of this patent is extended or adjusted under 35 U.S.C. 154(b) by 0 days.

(21) Appl. No.: 13/138,967

(22) PCT Filed: May 12, 2010

(86) PCT No.: PCT/GB2010/000940
§ 371 (c)(1),
(2), (4) Date: Dec. 23, 2011

(87) PCT Pub. No.: WO2010/130989
PCT Pub. Date: Nov. 18, 2010

(65) Prior Publication Data
US 2012/0086384 A1  Apr. 12, 2012

(30) Foreign Application Priority Data
May 12, 2009 (GB) .................... 0908112.6

(51) Int. Cl.
*H02P 1/04* (2006.01)

(52) U.S. Cl.
USPC ............ 318/400.33; 318/400.35; 318/400.32; 318/799

(58) Field of Classification Search
USPC .................. 318/799, 400.33, 400.35
See application file for complete search history.

(56) References Cited

U.S. PATENT DOCUMENTS

| | | | | |
|---|---|---|---|---|
| 5,070,291 A | * | 12/1991 | Nakamura et al. | ............... 318/77 |
| 5,212,435 A | * | 5/1993 | Dutro | ............... 318/785 |
| 2004/0094394 A1 | * | 5/2004 | Muench et al. | ............... 200/14 |

FOREIGN PATENT DOCUMENTS

JP   2004088943 A * 3/2004

OTHER PUBLICATIONS

Chunpeng Zhang;Fei Lin;, 'A single current sensor control tecnique for induction motors,'Power System Technology, 2002. Proceedings. PowerCon 2002, Oct. 13-17. International Conference on, vol. 4, no., pp. 2290-2293 vol. 4, 2002 doi: 10.1109/ICPST.2002.1047192.*

* cited by examiner

*Primary Examiner* — Eduardo Colon Santana
*Assistant Examiner* — Bickey Dhakal
(74) *Attorney, Agent, or Firm* — William H. Bollman (57) ABSTRACT

Speed of a motor, generator or alternator, more particularly the speed of an alternating current (AC) induction motor is determined. Problems associated with previous devices are overcome by providing a speed monitoring device that is readily retrofitted to an existing motor. A test signal is superimposed onto an input voltage, which voltage in use is applied to at least one winding of the stator of a motor (the test signal is at a frequency substantially equal to the rotor frequency). The test signal frequency is varied so that it varies from a minimum frequency to a maximum frequency. A current monitor monitors a resultant current, in the at least one stator winding. and deriving from the resultant current is a signal indicative of the rotor frequency.

17 Claims, 12 Drawing Sheets

| | | |
|---|---|---|
| $R_1$ | = | STATOR RESISTANCE |
| $L_1$ | = | STATOR INDUCTANCE |
| $R_w$ | = | Rx(Function of Rotor Speed, Windage, friction and load related stator losses) |
| $R_2$ | = | ROTOR RESISTANCE |
| $L_2$ | = | ROTOR INDUCTANCE |
| $P_1$ | = | Drive Voltage related back EMF and Power Transfer to Load |
| $P_2$ | = | Test Signal related back EMF and Power Transfer to/from Rotor |

Simplified Equivalent circuit of a running motor and with test signal close to actual rotational speed

APPARATUS AND METHOD FOR DETERMINING SPEED OF AN INDUCTION MOTOR

FIELD

The present invention relates to an apparatus and method for determining the speed of motors, generators or alternators and has specific but not exclusive application to induction motors. More particularly, but not exclusively the invention relates to an apparatus and method for determining the speed of a motor for use with a motor controller, specifically, though not exclusively, for use with an alternating current (AC) induction motor.

BACKGROUND

A key requirement for efficiently operating induction motors is to run them under ideal conditions, by providing optimum electrical drive waveforms using minimum power input while maintaining the desired speed. In order to do this it is essential to know the speed at which they are running and this has not always proven straightforward.

AC induction motors, that typically operate with a 50 Hertz (Hz) AC supply, are cheap to manufacture and reliable to operate. These motors are found in a myriad of industrial applications, such as for pumps, compressors, fans and drive systems. AC motors can be sub-divided into types according to the number of phases of the power supply. For example, AC motors may be single or three phase. Three phase AC induction motors tend to be more efficient than single phase AC motors. In recent years there has been growing legislative pressure to improve inefficient machines, reduce unnecessary energy waste and minimise so-called 'carbon related emissions; i.e. from the perspective of their effect on environmental conditions. Pressure is in the form of lobbying, private pressure groups and also from increasingly stringent legislation and is particularly directed at electric motors.

Designers of electric motors and motor controllers have therefore concentrated on ways of improving the efficiency of motors and their controllability, with a view to operating them at optimum conditions so as to extract more useful power.

In an attempt to increase the efficiency of the ratio of electrical power in—to the useful power out, there is a trend to use Electrically Commutated Motors (ECM) instead of Induction Motors. Although EC motors do have some advantage in terms of efficiency compared with a standard induction motor, this comes at a price. In particular ECMs suffer from magnet desaturation if overloaded, thus resulting in an absolute torque limit. Also there is a tendency for the magnets to wear out over a period of time. Furthermore, motor cogging may occur due to the pulse nature of winding currents and also rotor position and rotation sensing elements may be required within the motor itself.

It should also be noted that the production and disposal of permanent magnets gives rise to potentially environmentally-damaging pollutants that require specialised handling and treatment. This raises issues for both their manufacture and end of life recycling.

One area of particular interest is AC motors that are rated at mains voltage (typically 230 volts), but driven with an input voltage of around 50-180 volts. One reason for this is that these motors are very common as they are used in many types of domestic equipment and industrial systems such as: domestic appliances, coolers, ventilation and air conditioners. Manufacturers are being encouraged both by legislation and the perceived benefits of adopting an environmentally-responsible attitude in an attempt to ensure they meet the increasingly stringent environmental demands.

Losses and inefficiencies of many AC induction motors were in fact due to the imbalance that often exists between the requirements of a mechanical load, the way a motor operates and the control and conditioning of available power. The net result is that in the past a significant amount of energy was wasted.

The exact speed of an induction motor is normally measured using external or internal components or devices such as a 'tacho', a Hall Effect device or an optical device, for example.

An approximate speed may also be calculated using theoretical mathematical models, for a particular make and size of motor with a particular load. The generalised extension of these models may have a significant level of inaccuracy.

PRIOR ART

As mentioned above, a drawback of many motors has been that they require accurate sensors to monitor their speed and to control them. One technique of controlling motors is to employ a Hall Effect sensor which monitors and senses rotor position. This, in combination with a feedback loop, provides an indication of position, which in turn can be used with a phase angle controller to vary motor speed and/or torque. An example of such a device is described in U.S. Pat. No. 4,849,871 (Wallingford). However, a disadvantage with such systems was that delicate sensing equipment needs to be housed in a motor casing and this was not always possible in harsh or vibrating environments.

U.S. Pat. No. 5,729,113 (JANSEN) discloses an induction motor controller and includes means for determining rotor speed without using speed sensors. A pair of test signals ($T_e^*$ and $\lambda_r^*$) are injected into the motor controller and superimposed on motor drive voltages. The test signals may either be injected as current signals or directly superimposed as voltage signals ($v_x^*$ and $v_y^*$). These superimposed signals are low power, and of low frequency (typically 5-30 Hz) and are applied counter to the rotor rotation. Motor voltages and current are measured (or two sets of measurements are taken and a third calculated) and an indication of rotor speed is determined from injected signals.

U.S. Pat. No. 6,449,567 B1 (DESAI) describes another example of a system for determining motor speed from an analysis of an electrical signature of the motor.

A yet further system is described in Japanese Patent Application 2004-88943 (NAGOYA), which discloses an induction motor controller and motor speed estimator.

Generally all the speed determining devices described require extra components, such as sensors, to be added inside or outside the housing of the induction motor. Over the last few years, work has and is being undertaken in order to perfect a technique of measuring motor rotor speed without using any extra components. Principally this work has been based on harmonic analysis of the motor current waveform. So far this has proved to require a very sophisticated mathematical approach and consequently the use of powerful processors to obtain results. The harmonic components that are being analysed are themselves caused by manufacturing variables which by their very nature are unpredictable.

Thus none of the aforementioned devices and methods disclosed provide a simple device, that is cheap to manufacture, easy to install and capable of operating in a wide variety of motors.

The invention therefore arose in order to overcome the aforementioned problems and specifically to provide an apparatus for monitoring motor speed, specifically for use in an induction motor controller and in order to increase the efficiency of an induction motor and the overall efficiency of the drive and motor combination.

Another aim of the invention is to provide a speed monitoring device that is readily implemented, is small, robust, easy and cheap to manufacture; which is straightforward to retrofit; and which is adaptable to a wide range of power and torque requirements.

Another aim of the invention is to provide a speed monitoring device that is readily retrofitted to an existing motor.

SUMMARY OF THE INVENTION

According to a first aspect of the invention is provided an apparatus for determining the speed of an induction motor, the motor includes at least one stator and at least one rotor, which in use, rotates at a rotor frequency, in a first sense, the apparatus comprises: a means for superimposing a test signal onto an input voltage, which input voltage in use is applied to at least one winding of the stator of the motor, the test signal being at a frequency substantially equal to the rotor frequency; a means for varying the frequency of the test signal so that the test signal is swept from a first frequency to a second frequency; and a current monitor for monitoring a resultant current arising as a consequence of said swept frequency, in said at least one stator winding thereby deriving from said resultant current a signal indicative of the rotational frequency According to a second aspect of the invention is provided a method for determining the speed of an induction motor, the motor including at least one stator and at least one rotor; comprising: superimposing a test signal onto an input voltage to at least one winding of the stator of the motor; varying the frequency of the test signal; and monitoring parameters of the stator winding, or on the stator side, as a function of or dependent upon test signal frequency, and deriving therefrom said speed.

According to a third aspect of the invention there is provided an apparatus for determining the speed of an induction motor, the motor including at least one stator and at least one rotor; comprising means for superimposing a test signal onto an input voltage to at least one winding of the stator of the motor; means for varying the frequency of the test signal; and monitoring means for monitoring parameters of the stator winding/input or on the stator side, as a function of or dependent upon test signal frequency, and means to derive therefrom said speed.

The speed is determined from the rotational frequency of the rotor.

The parameters may be indicative of the effective rotor impedance or phase.

The parameters may include the current in the stator winding.

The parameters may include one or more of the following: the test signal voltage and/or the test signal current and/or the test signal amplitude and/or the phase therebetween.

The parameters may further include one or more of current, voltage and phase with respect to the stator winding The speed of the rotor may be indicated when said rotor impedance is indicated to be a maximum/infinite.

Means may be provided for sweeping the test signal from a first frequency to a second frequency.

In use the superimposed test signal preferably has an amplitude between 20-40 dB less than the voltage applied to each phase of the motor.

The means to vary the frequency of the test signal is preferably a pulse width modulator.

Thus there is provided an apparatus for determining the speed of an induction motor, the motor includes at least one stator and at least one rotor, which, in use, rotates at a rotor frequency, the apparatus comprises: a means for superimposing a test signal onto an input voltage, which voltage in use is applied to at least one winding of the stator of the motor, the test signal being at a frequency substantially equal to the rotor frequency; a means for varying the frequency of the test signal so that it varies from a minimum frequency to a maximum frequency; and a current monitor for monitoring a resultant current, in said at least one stator winding; and deriving from said resultant current a signal indicative of the rotor frequency.

Thus it is apparent that the resultant current in the stator winding is preferably monitored at the superimposed test signal frequency. Preferably only the effects of the test signal are determined. This is achieved by monitoring at the test frequency using an arrangement to accept the test frequency current while rejecting the main drive current.

The test signal may be introduced into the motor, for example by varying pulses using a pulse width modulator (PWM); or by way of a device that is connected between a supply voltage and the motor. The invention provides a flexible solution to the problems referred to above and suffered by prior art systems.

Means may be provided for varying the amplitude of the test signal. The amplitude may be varied to a minimum, which may be zero volts. A Although there is described a method of measuring rotor speed, the present invention is principally concerned with improving the accuracy of non-invasive speed determination of induction motors in order to improve their efficient operation.

Once derived this information may be used to improve the efficiency of induction motors, particularly AC induction motors, by providing a more suitable method of monitoring speed so as to, for example, take into account variations in ambient and/or load conditions; variations in characteristics of the motor; aging of components; or environmental effects, so that the operation of the motor is optimised by operating it as efficiently as possible at its ideal speed.

Ideally the superimposed test signal has an amplitude substantially lower (by 20-80 dB) than the voltage that is applied to the motor. The superimposed test signal has amplitude that is less than around 20-40 dB of the applied motor voltage because otherwise it might interfere with the normal operation of the motor.

Typically the superimposed test signal has an amplitude that is greater than around 80 dB below the motor voltage because otherwise the influence of noise and other ambient signals tend to affect, or swamp, the value of the resultant current of the test signal and any resultant current cannot be reliably derived from said at least one stator winding.

The test signal may be either introduced into a motor drive itself, for example by varying the pulse width modulation (PWM) by a small amount, typically 0.1% to 10%, or by way of a unit that connects between a power supply and the motor. For example the test signal may be introduced via a retrofit device that is either connected to a mains electrical supply to the motor or directly to the induction motor. The device may also be connected between an existing motor drive and the motor.

Thus there is provided a method for determining the speed of an induction motor, the motor includes at least one rotor, which, in use, is rotating at a rotor frequency, the method comprising the steps of: superimposing a test signal onto an input voltage, which voltage in use is applied to at least one winding of the stator of the motor, varying the test signal at a frequency substantially equal to the rotor frequency from a minimum frequency to a maximum frequency; and monitoring the resultant current, in said at least one stator winding; and deriving from said resultant current a signal indicative of the rotor frequency.

The principle on which the speed determination method is based is that it has been found that an induction motor can be considered as behaving as both a generator and a motor simultaneously. The main motor driving voltage is at either mains frequency, (typically, 50 or 60 Hz) or a specifically generated frequency in the case of a motor drive. In use the motor runs at a rotor speed below this frequency depending on the amplitude of the motor driving voltage, characteristics of the motor and also the applied mechanical load to the motor. The test signal may be applied to one or more windings of the stator and the direction of rotation of the test frequency (if relevant) is usually in the same direction as the main motor driving frequency.

Therefore as the frequency of the test signal is swept either side of the actual rotor rotational frequency, the following occurs: when the test frequency is above the rotor rotational frequency, current effectively flows into the rotor as though it was a motor; and when the test signal frequency is equal to the rotor rotational frequency, the rotor impedance becomes effectively infinite and the test signal current only flows in the stator impedance.

The synchronous speed of the motor may be determined from the test signal. Actual motor speed may be determined relative to the motor driving voltage and frequency. When the test signal frequency is below the rotor rotational frequency, the induction motor behaves as a generator as far as the test signal is concerned. The rotor therefore generates power which is fed back into the test frequency source.

There are likewise preferred features of a method for determining the speed of an induction motor, which correspond to the preferred features of the apparatus. Other aspects of the invention are referred to in the claims.

Embodiments of the invention will now be described, by way of examples only, and with reference to the Figures, in which:

DETAILED DESCRIPTION OF PREFERRED EMBODIMENTS OF THE INVENTION

One way of modelling AC induction motors is a resistor-inductor (RL) circuit model, shown diagrammatically in FIG. 1 whereby the stator and rotor have both resistive and inductive elements. In single and three phase induction motors the actual speed of the rotor is related to the frequency of the drive waveform by the number of motor poles and the amount of slip.

At standstill when the rotor is stationary and the electric field is rotating in the stator, slip s=1 and at synchronous speed where the rotor rotates at exactly the same speed as the rotating field in the stator, s=0 and there is no relative motion between the rotating field (in and emanating from the stator) and the rotor. Consequently there is also no torque imparted to the rotor.

Induction motors normally run at a speed below synchronous speed. The degree of slip depends on many factors, but is typically in the range of 0.05 to 0.5. However, if an induction motor is run above its synchronous speed, then it can effectively become an induction generator or alternator. Conversely when the value of slip is negative, torque is absorbed by the rotor and imparted as energy flowing out of the stator.

The conventional modelling FIG. 1 used to describe induction motors does not properly allow for this condition at synchronous or above synchronous speed operation.

Consequently a model has been developed to more accurately describe the motor operation with both the main drive power and the test signal applied simultaneously. This is shown in diagrammatical form in FIG. 2f.

One way of interpreting the model is to consider the operation of the various circuits and drives one at a time. Assuming the test signal amplitude is at zero, the motor behaves as normal with a main drive of a certain frequency and amplitude. It develops a certain amount of torque and runs below synchronous speed. Using the aforementioned RL circuit, shown in FIG. 2f, with the test signal being at zero, does not alter the main drive voltage. The main drive current is thus determined in the usual manner.

If the test signal is now applied and the test signal frequency is chosen at the same frequency, phase and rotation direction as the main drive current and the amplitude is increased by 1/100 or 40 dB below the main drive voltage. This has the effect of increasing the voltage into the motor by about 1%. If the test frequency is now progressively lowered, the current going into and out of the motor can be expressed as two separate currents, at two different frequencies, both coexisting at the same time. The term "stator parameters" are to be considered and interpreted hereinafter to mean any electrical parameters of the motor.

If the test waveform voltage and current are observed, as the frequency is reduced from the main drive frequency, rotor impedances effectively increase in value, as the back emf from the rotor and the applied test signal voltage become closer one to another. The power and consequential torque transmitted to the motor load by the test signal also reduces to zero as the test signal frequency approaches the rotor rotational speed.

The combined effect of the rotor impedances, rotor back EMF and motor output power becomes negligible at the point the test signal frequency is equal to the rotor rotational speed. The test signal current at this instant is determined by the stator impedances. The effect of the test signal current on the stator current (or other stator electrical parameters) is therefore determined by the stator electrical parameters.

As the test frequency is reduced below the rotor rotational speed, the rotor generates current at the test frequency which is fed back to the test frequency voltage source connected to the motor. The net current at the test frequency is now effectively the sum of the stator current and the generated current from the rotor.

As the test frequency is reduced even lower, the rotor generated current increases proportionately and significantly swamps the current drawn by the stator impedances.

Thus for example by sweeping the frequency of a test signal, which is ideally a time varying sine wave, whose voltage (V) is a function of a sin (ωt), it is possible to determine the synchronous speed without invasively monitoring of the motor.

This is done because it is often desirable to measure the rotor speed directly. To do this the drive voltage waveform is modified with an additional voltage component, that is typically around −40 dB less amplitude than the main drive voltage and at a frequency about the same as the actual rotor frequency. The addition of the test voltage at the test frequency may be carried out on either one or on both of the main and auxiliary phases/windings of a single phase motor or on any or all of the three phases/windings of a three phase motor. The phase rotation may be in the same rotational direction as that of the main drive frequency.

An output current may be derived from at least one of the winding currents. An indication of the phase angle of the current at the test frequency may also be obtained.

By sweeping the test voltage frequency either side of the rotor frequency the impedance and phase angle of the rotor can be determined at close to synchronous speed.

From this one of three states may be derived:
1. The effect of the rotor is a net absorber of energy.
2. The effect of the rotor being invisible at synchronous speed.
3. The effect of the rotor is a net generator of energy.

Dealing with each of these separately below:

The Effect of the Rotor being an Absorber of Energy

This is the normal state of an induction motor. The test frequency is above the rotor frequency. The rotor impedances appear across the stator windings in the usual manner as indicated by conventional lumped parameter analysis.

The Effect of the Rotor being Invisible at Synchronous Speed

At the synchronous speed slip (s=0) and as far as the test voltage at the test frequency is concerned, the rotor current is zero and the rotor impedance is effectively infinite. The measured impedance and phase angle is solely due to stator lumped parameters.

The Effect of the Rotor being a Generator of Energy

If the test frequency is below the synchronous speed of the rotor the induction motor now behaves as a generator/alternator as far as the test frequency voltage is concerned. Slip is now a negative value and the rotor impedances are now effectively reflected into the stator as negative values. The combined values of the stator impedances and the negative rotor impedances result in a composite impedance where the rotor impedances overwhelm the stator impedances.

The Net Effect of Synchronous Speed on the Test Signal Current Amplitude and Phase Angle It is found that this test method produces results that do not require the characteristics of the motor to be known. It is also not necessary to have an exact equivalent circuit model from which to extrapolate. Consequently it is motor and motor modelling independent.

Figure 1A:
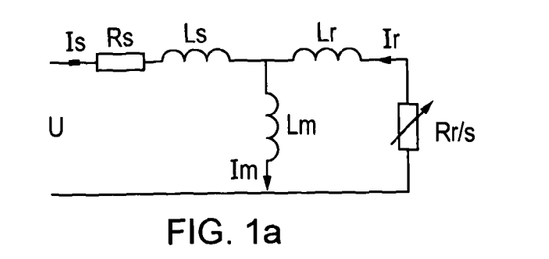
FIG. 1 is an example of several diagrammatic representations of a motor, modeled using inductive and resistive components.
Figure 1B:
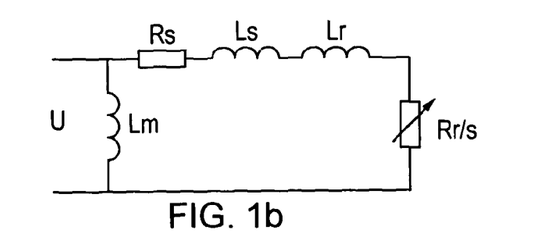
Figure 1C:
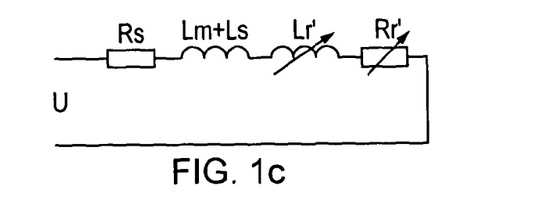
Figure 1D:
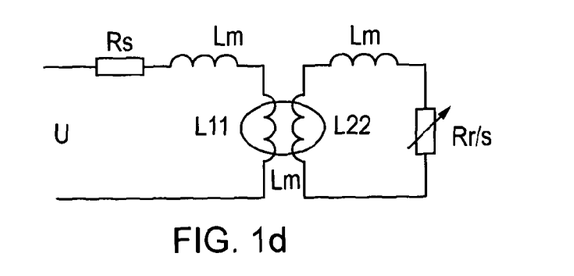
Figure 1E:
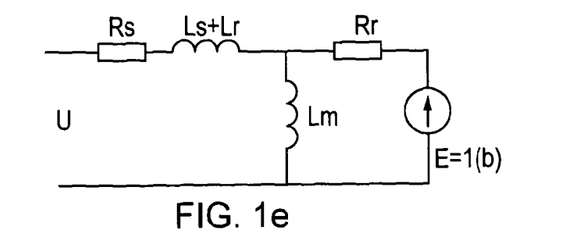
Figure 2A:
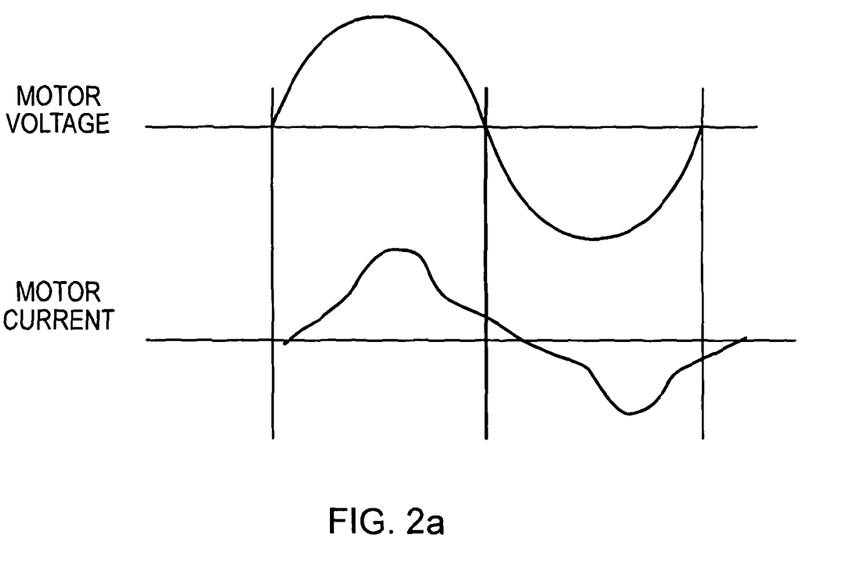
FIG. 2a shows a graph of drive current of a motor, for example of the type in FIG. 1.
Figure 2B:
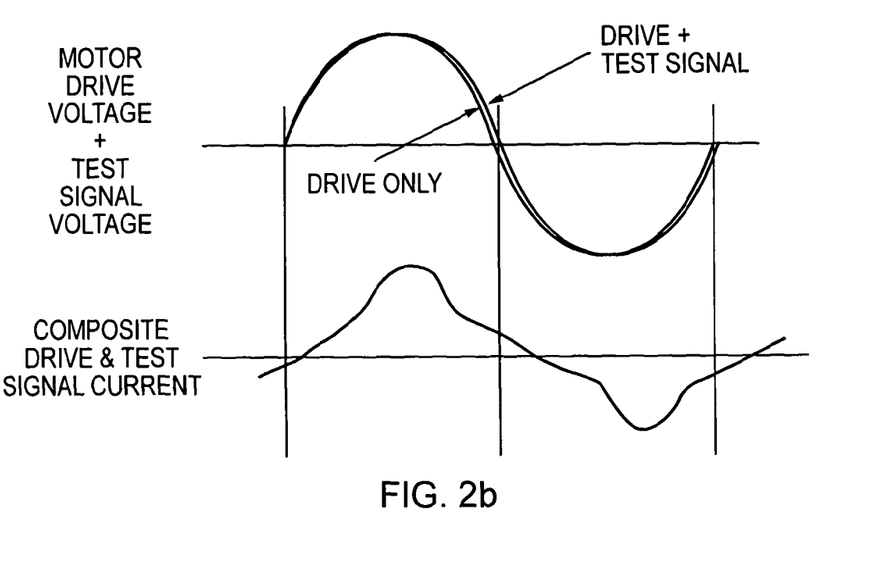
FIG. 2b shows a graph of drive current with a test signal current superimposed on a main drive current.
Figure 2C:
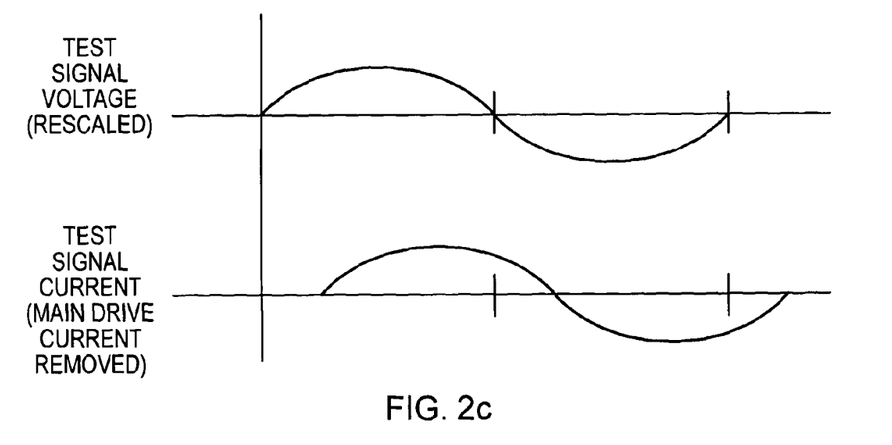
FIG. 2c shows a graph of the test signal current with the main drive current removed.
Figure 2D:
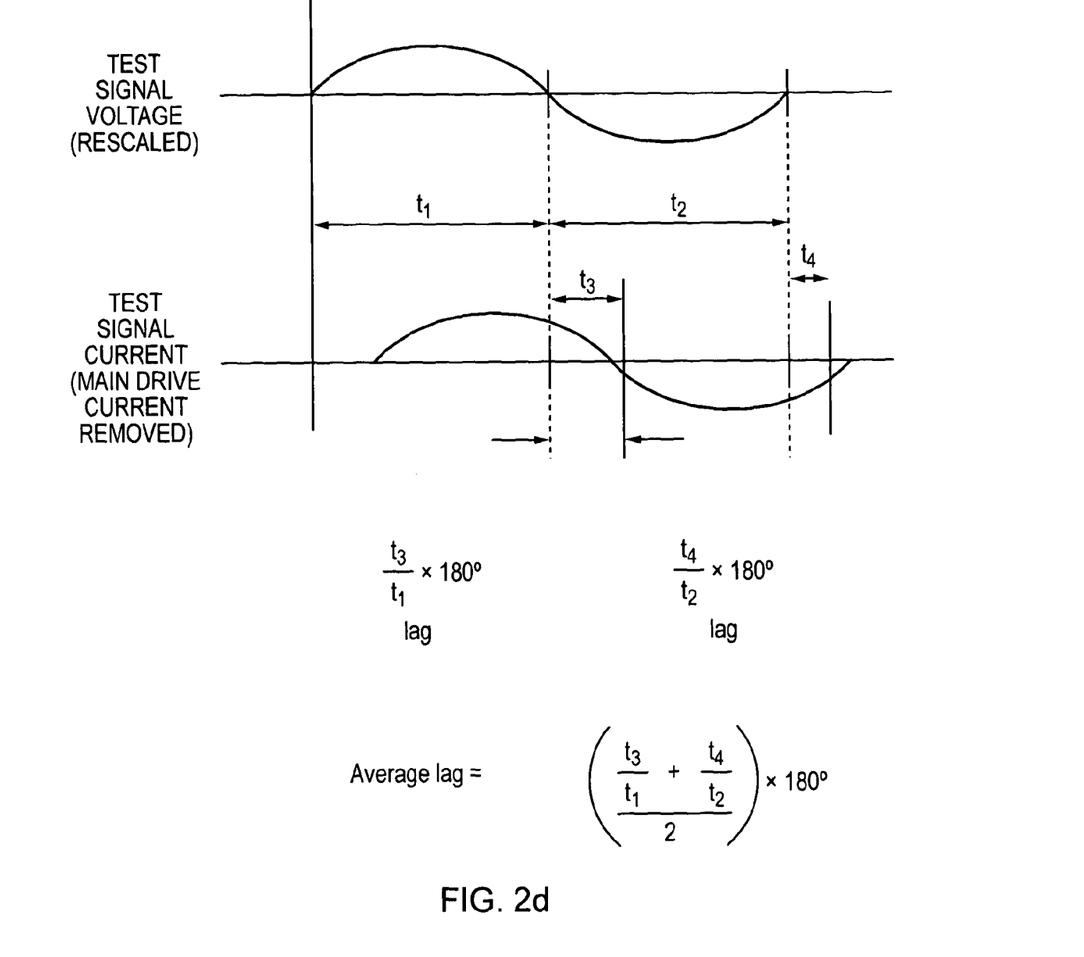
FIG. 2d shows a graph of a typical phase angle variation of the test signal current with reference to the test signal voltage.
Figure 2E:
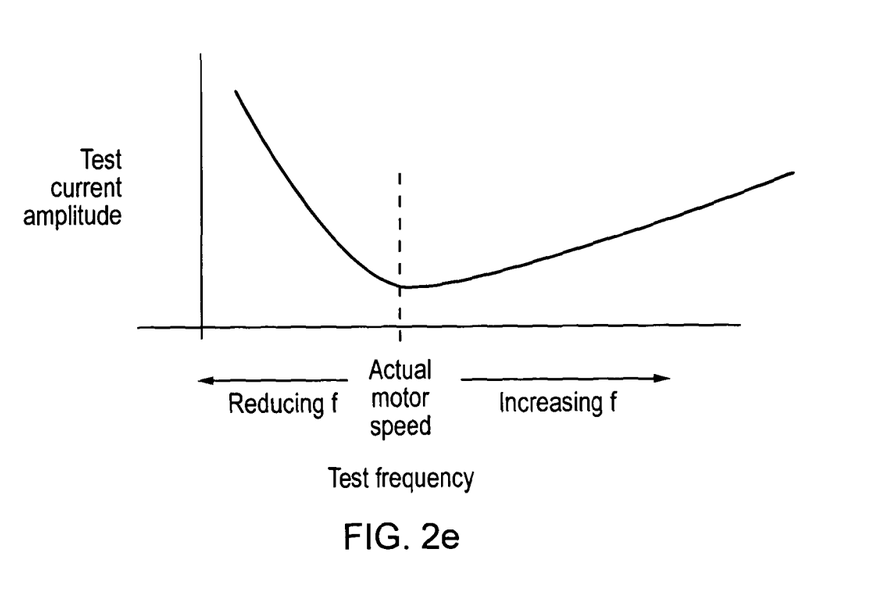
FIG. 2e shows a graph of a typical amplitude variation of the test signal current with reference to the test signal voltage.
Figure 2F:
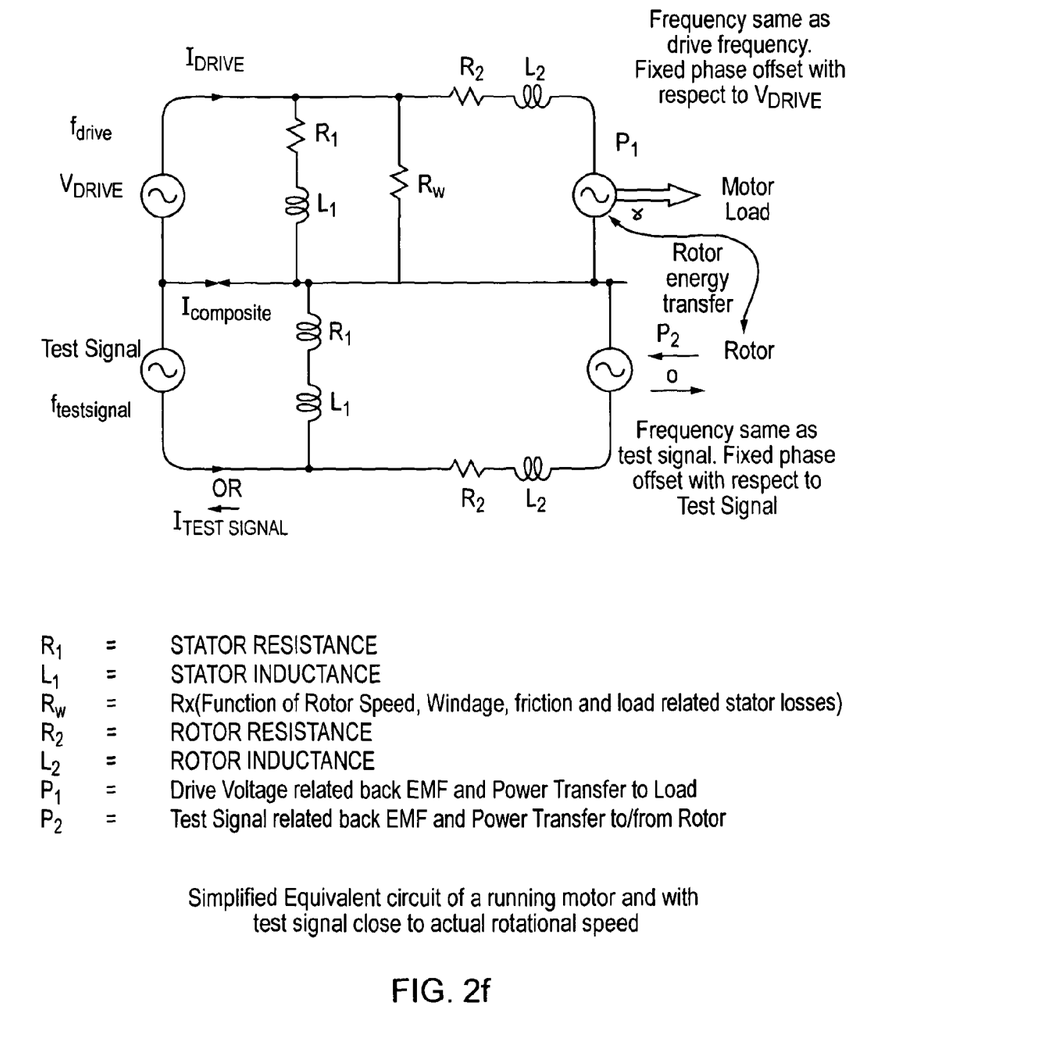
FIG. 2f shows a diagrammatic representation of a motor with both main drive power and test signal voltage sources modeled using inductive, resistive, motor/generator back emf and equivalent load power/source power components.
Figure 2G:
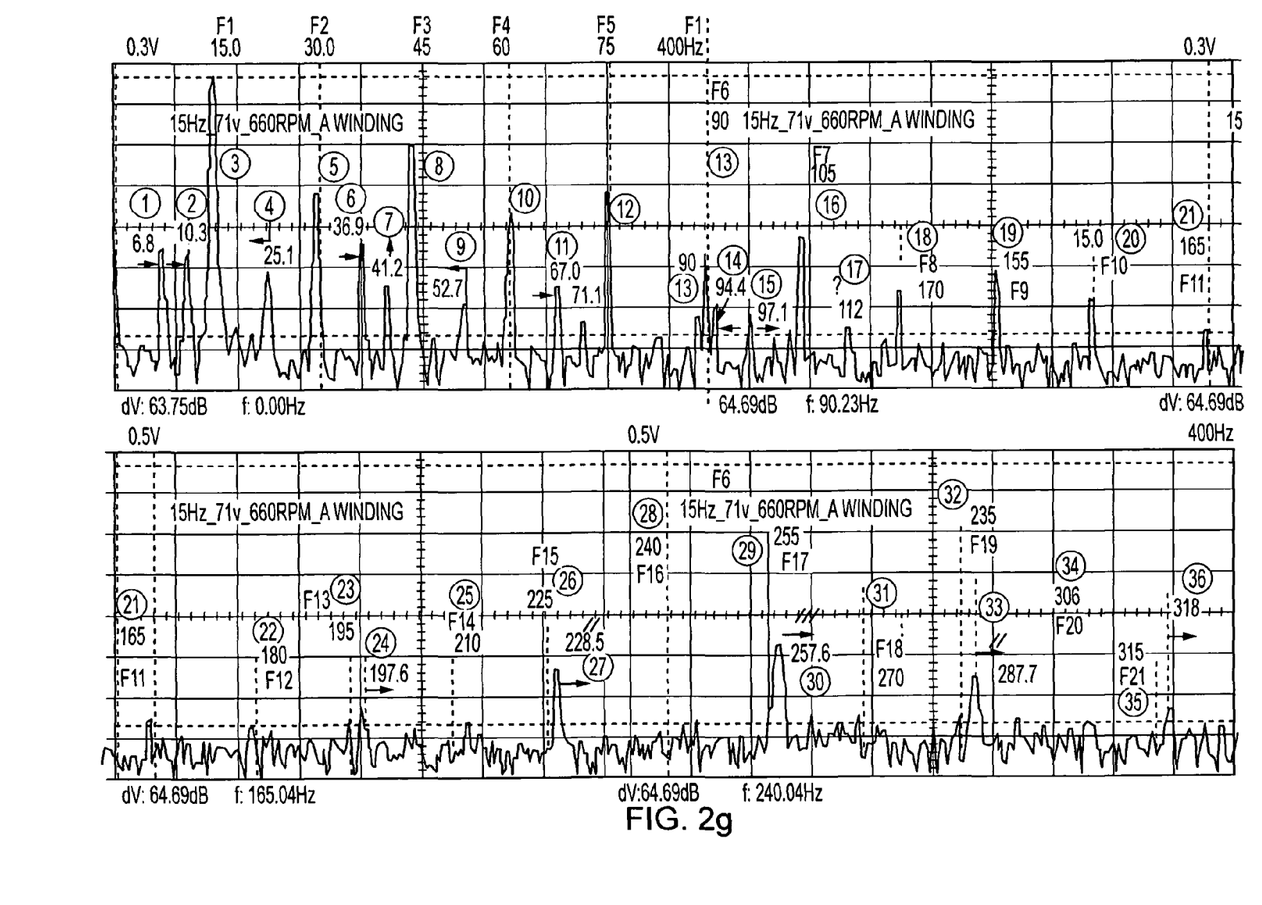
FIG. 2g shows a graph of a typical Fourier Transform analysis of motor drive current.
Figure 3:
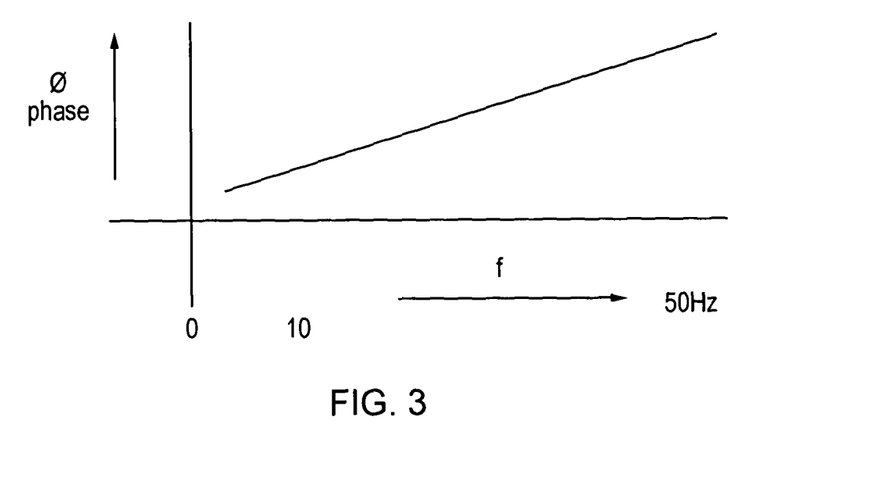
FIG. 3 is a graph showing phase variation of a test voltage and derived test current with a swept test frequency from 10 Hz to 50 Hz, with rotor not rotating.

Thus for example for a swept frequency where voltage (V) is a function of a sin (ωt) Referring to the equivalent circuit shown in FIG. 2f, when the test frequency is equal to the actual rotational speed of the rotor, generator P2 is of equal amplitude to the test signal generator. The test signal only feeds into L1 and R1. The phase offset between the test signal and the back emf signal is considered to be zero at this point.

There is a plurality of methods to extract the test signal current and phase from the composite current waveform. Some are described briefly below.

1 Zero Cross Point

The effect of the addition of the main motor current and the test signal current is to cause the composite current zero cross point to oscillate slightly in time either side of the point where it would have been zero if it was the main motor current only. This means that the test signal current amplitude and phase can be entirely determined by measuring the absolute and differential time of every positive to negative and negative to positive transition.

The advantage of this method is that it uses the most basic facility of the lowest cost microprocessor or microcontroller or microcomputer, which is its capability to time an interval and this is done using its clock counting mechanism which is also extremely accurate and capable of operating with a high degree of precision. The test signal amplitude and phase can be calculated with relatively simple mathematics and quickly, which are further prerequisites if a low cost processor is to be used.

The advantage of the zero cross method outlined above is that it effectively nulls out the effects of current odd harmonics of the motor due to iron saturation. In any event because of the symmetrical nature of the load, even harmonics are quite low but the half cycle measurement effectively allows for this to be nulled out. A low current consumption microprocessor is perfectly suited to the task required here. This is because an analog-to-digital converter (ADC) is not required and similarly there are no complex or 'processor hungry' mathematics such as Fourier analysis that are required.

The zero cross point of the motor coil current zero may be detected using several methods. In particular, a low value series resistor may be placed in series with the motor winding and the voltage measured across this resistor and therefore the current flowing through the resistor determined. This resistor is connected to a comparator for example.

A sensor such as a Hall Effect device may be used to measure the point when the magnetic field induced by the motor current is zero.

The voltage drop across the drive output switching devices may be used to determine the current zero. The output devices either have an intrinsic diode or an external diode placed across the device to provide a reverse current path for the motor inductive currents at the switching transition. The output device therefore either has a positive voltage drop across it due to its internal resistance Rds, Vcesat or Vdssat. It has a negative drop due to the Vak of the internal or external diode. The voltage across the device is zero when the current through this parallel transistor diode combination is zero. This voltage can be quite well defined even at low current levels. It is easily determined with a voltage comparator.

2. Analog-To-Digital.

This method requires an analog-to-digital converter (ADC) capable of measuring full motor current at its peak value. As the test signal is typically 40 dB below this current value and precision at this level is required, an ADC of 14 to 16 bit resolution is ideally required. Once the composite current is digitised, at say 1,000 to 10,000 samples per second, the numbers are then processed in the software domain. The software ideally includes Fourier Transform and other signal processing software in order to filter out the fundamental, $2^{nd}$, $3^{rd}$ and higher order harmonics of the main motor current, thereby providing a waveform free from unwanted signals. This waveform can be considered to be the fundamental waveform of the test signal current. Using relatively simple mathematics it is now possible to determine the test signal current amplitude and phase.

This method provides a quicker and more accurate estimate of rotor speed, but at the not inconsiderable expense of much more complicated and costly processors, significant software overhead and high chip current consumption.

There are several methods that employ the test frequency voltage, current, phase angle and frequency to determine the actual rotor speed.

3a) Phase Peaking and Swept Frequency Using Minimum Current Approach

The current amplitude of the test frequency is plotted against the test frequency. The current reaches a minimum when the rotor impedance effectively is infinite, as shown in FIG. 2e.

Continual Start Point Reset of Test Signal Waveform, in Relation to Motor Drive Voltage, is a Further Alternative Test Technique.

By determining the start point on a half cycle by half cycle basis, it is possible to considerably speed up the rotor frequency determination and at the same time to make the mathematics simpler and therefore faster to compute. By adjusting the start point of the test waveform it is possible to always be testing at the point of minimum, or maximum, interference between the test signal and the main supply voltage to the motor. If the test signal is continuous, there can be significant periods of time where the instantaneous phase difference between the two frequencies does not provide very useful information. If the start point of the test voltage is adjusted so that there is no net offset of the composite current waveform at the instant of zero cross point, then the phase lag or lead of the test current, with respect to the test. voltage, can be easily calculated. Likewise if the start point of the test voltage is adjusted so that there is a maximum offset of the composite current waveform at the instant of zero cross point, then the peak amplitude of the test current, with respect to the test voltage, can be easily calculated.

3b) Composite Test Method

The zero cross method may be used to get a quick determination of rotor speed which can then be refined by doing a simple fast Fourier analysis over a very limited range. In this case each part of the process is relatively quick and of limited accuracy but the two processes together gives a quick response with good accuracy. Such a combination of steps could reduce the cost of the processing.

3c) Phase Relationship of Test Waveform

The waveforms of drive current and test current may be in phase, or in anti-phase. The different phasing results in different responses from the motor as the test frequency is swept about the motor rotor speed.

Figure 4:
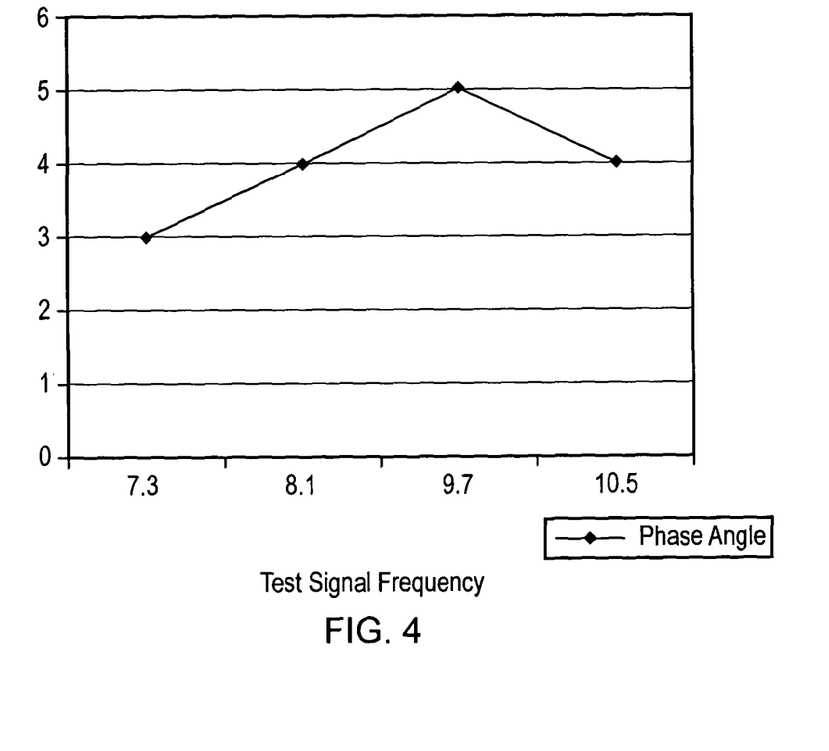
FIG. 4 is a graph of phase angle against rotating test frequency and shows a clear peak indicative of actual rotor speed.

Referring to FIG. 4, by plotting the phase angle of the test signal current with respect to the test signal voltage against the test signal frequency, a peak in the plot indicates the point where rotor speed is equal to test signal frequency. This technique does not require any knowledge of the exact values of the induction motor inductance or resistance of either the stator or the rotor and works with any induction motor.

There are several methods by which the test signal voltage can be superimposed on the drive voltage to form the composite voltage waveforms that are applied to the motor stator windings. One is referred to as being internal to the drive and involves introducing the test signal by modifying a drive pulse width modulation (PWM) output by adding the test signal voltage to the existing drive voltage. This can be done either in the software or the hardware. The zero cross of the motor current waveforms is easily accessed via the current sensing that is normally present in the drive. This modification to measure the motor speed is therefore typically a 'no cost' option, in that components are already present, with the exception of a one-off software cost to implement it initially.

It can also be done by additional components for providing the low level test signal and or the current measuring and timing if required.

Alternatively a test signal can be introduced external to the drive or supply. This may be achieved, for example, as an 'add-on' or retrofit unit between the drive (if used) and the induction motor.

Effectively this is a direct injection and monitoring of the modified current waveform. This method therefore allows for an existing motor to be measured and this has the benefit that it allows for significant energy and efficiency improvements to be achieved without motors or equipment having to be disturbed or replaced. This technique also allows motors, for which access is limited or impossible (such as compressors with integral motors), to have their speed measured and for them to be efficiently monitored and controlled.

In a further alternative, a test signal can be introduced using motor characteristics.

Thus in the embodiment in which only one test waveform is employed, as the motor is already rotating, a rotational field is not always required for the test signal. This is the case, for example, in single phase, capacitor start type motors that run on one winding once they have been started and run up to working speed.

Thus in the case of a test waveform on a capacitor run motor, it is possible to measure the speed of a capacitor run motor by introducing one test signal on the common connection of a capacitor run motor. The test signal current also only requires one connection to the common connection.

Where there are two or more phases, it is possible to measure the speed of multi phase motors with just one test signal and current monitoring connection. However, more than one connection improves accuracy and acquisition time of the rotor speed.

A further alternative embodiment is one in which only hardware—that is wired devices—are used for test signal motor speed determination. This is described with reference to all the Figures, but with particular reference to FIG. 5, in which there is shown a block diagram illustrating a motor 10 across which an alternating voltage is applied at a frequency (F1) which is intended to drive the motor. An amplifier introduces the test signal in series with the main motor current. The current zero of the composite motor current is passed through R1. The comparator COMP1 detects the zero point of this current. The resultant square wave is applied to one input of a phase locked loop PLL1. The output form PLL1 is compared with the test signal frequency and the jitter decoded.

Figure 5:
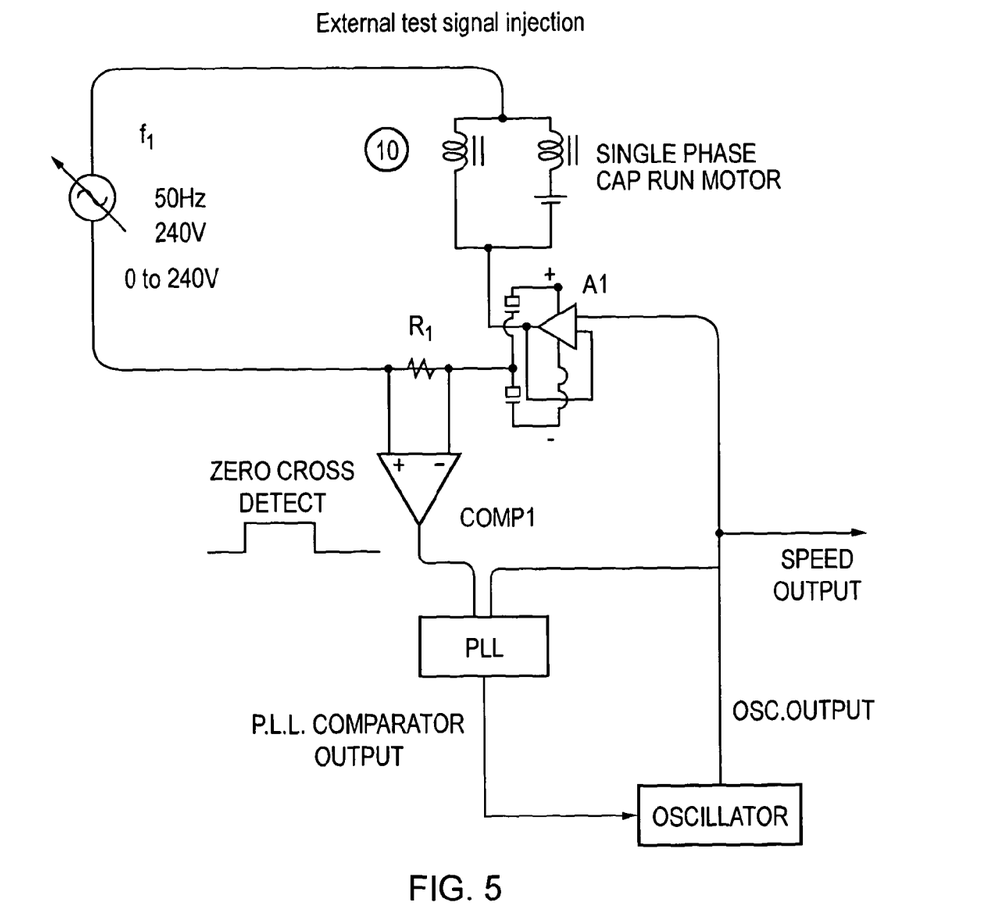
FIG. 5 is a circuit diagram of an embodiment of the invention.
Figure 6:
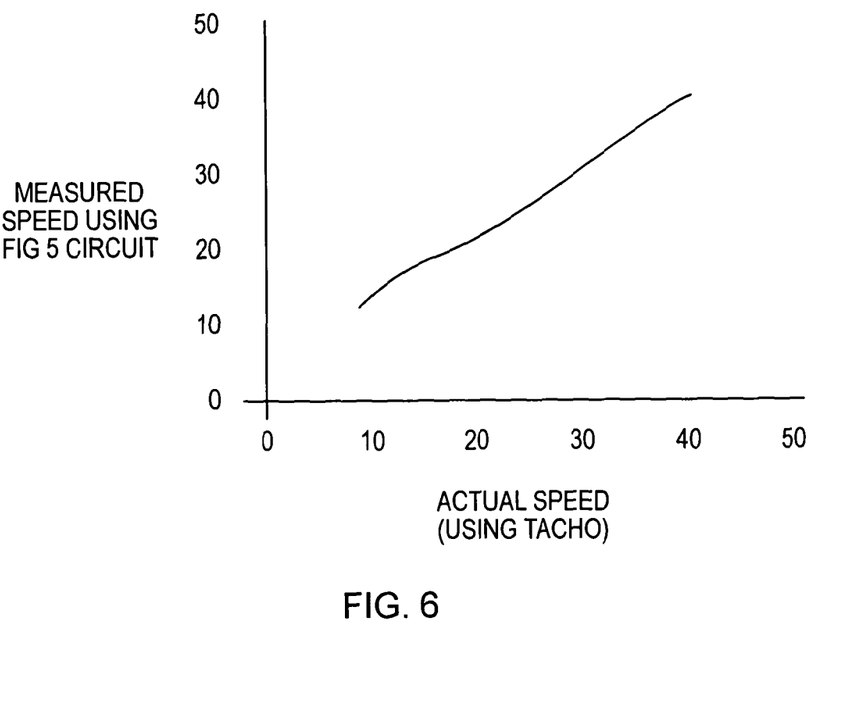
FIG. 6 is a graph of actual speed against measured speed of a motor whose speed was measured using the embodiment shown in FIG. 5.

The amplitude of the jitter is directly related to the amplitude of the test frequency current. Oscillator 27 adjusts itself to the minimum jitter. The frequency at minimum jitter is the motor rotational speed.

An all software embodiment of the test signal motor speed determination is achieved by the modification of the drive PWM output or the timing of the output waveforms, while measuring the timing of the current zero points or measuring the current values in relation to time. The motor speed is determined by the minimum phase deviation or the minimum zero point time deviation.

Using the technique of the test signal motor speed determination it is possible to remotely measure the speed of a motor for example down a well or in a hazardous area.

It is also possible to measure the speed of several motors at the same time. However, it will be understood that more processing is required.

It is possible to combine the above mentioned method of speed determination with a drive that is capable of adjusting the voltage, frequency etc of the applied waveforms to the motor, in order to tune for optimum power output at a given motor speed with the minimum power draw by the controlling drive and motor combination.

It is within the scope of the invention to make a drive where the voltage, frequency etc values that relate to a given speed and power are stored and that the system continuously adjusts these values for optimum operation.

It is possible that the drift in a look-up table over time will indicate motor and/or load changes. This could be reported as motor/load health monitoring and early warning of problems before they occur—for example motor characteristics may start to wander or vary dramatically, for example prior to a failure and fluctuations in these characteristics could be used as part of an advance warning system.

The technique of the test signal motor speed determination can also be used for motor drive waveforms where the amplitude of the drive waveform cannot be varied by the test signal. The way this is achieved is that the frequency, amplitude and phase of the main drive waveform and the test signal waveform are summed either in a separate analogue circuit or in software by a microprocessor. From this summation, the time point at which the two waveforms are equal in amplitude and opposite in polarity is the time point when the waveform applied to the motor changes polarity.

The current zero is detected as previously described and the motor rotational speed deduced. The reason this works is that the harmonic content of the summation of the two frequencies, the motor drive frequency and the test frequency is imposed upon the motor by the variation in the zero point time of the voltage applied to the motor winding. Detecting the zero current time demodulates the test signal from the fundamental drive frequency and the variation of the zero point time from its average value is a direct measure of the test signal current amplitude.

This test method allows the motor to be run from, for example, fixed amplitude square waves, sine waves or any wave shape chosen where the frequency of the wave is the synchronous speed of the motor.

The invention has been described by way of embodiments only with modifications and alternatives, but having read and understood this description, further embodiments and modifications will be apparent to those skilled in the art. All such embodiments and modifications are intended to fall within the scope of the present invention as defined in the claims.

The invention claimed is:

1. An apparatus for determining the speed of an induction motor, the motor includes at least one stator and at least one rotor, which rotor in use rotates at a rotor frequency, in a first sense, the apparatus comprises:
   a means for superimposing a test signal onto an input voltage, which input voltage is applied to at least one winding of the stator, the test signal is at a frequency substantially equal to the rotor frequency;
   a means for varying the test signal frequency so as to sweep the test signal from a first frequency, which is less than the rotor frequency, to a second frequency, which is greater than the rotor frequency, whereupon the test signal combines with the input voltage so as to generate a composite voltage waveform giving rise to a composite current waveform and deriving from zero cross points of a signal indicative of the rotor speed.

2. The apparatus for determining the speed of an induction motor according to claim 1, further comprising:
   means for monitoring parameters in the stator winding/input or on the stator side, as a function of, or dependent upon, test signal frequency so as to derive the rotor speed therefrom.

3. The apparatus according to claim 1 whereby, in use, the superimposed test signal has an amplitude between 20-40 dB less than the voltage applied to each phase of the motor.

4. The apparatus according to claim 1 wherein the means for varying the frequency of the test signal is a pulse width modulator.

5. The apparatus for determining the speed of an induction motor according to claim 1 includes a resistive load in a series with the motor.

6. The apparatus for determining the speed of an induction motor according to claim 1 which is included in equipment in the group comprising: pumps, compressors, refrigerators; air conditioning units, dehumidifiers, fans, washing machines, spin dryers, tumble dryers, food mixers, food processors, grinders, shoe polishers and ventilation fans.

7. The apparatus for determining the speed of an induction motor according to claim 1 that is potted and compact.

8. The apparatus as claimed in claim 2 wherein said parameters are indicative of an effective rotor impedance or phase.

9. The apparatus as claimed in claim 2 wherein said parameters include the current in the stator winding.

10. The apparatus as claimed claim 2 wherein said parameters include one or more of the following:
    a test signal voltage and/or a test signal current amplitude and/or the phase between the test signal voltage and the test signal current.

11. The apparatus as claimed claim 2 wherein said parameters include one or more of:
    current, voltage and phase between said current and voltage in the stator winding.

12. The apparatus as claimed claim 8 wherein speed of the rotor is indicated when said rotor impedance is at a maximum/infinite.

13. A method for determining the speed of an induction motor, the motor including at least one stator and at least one rotor which rotates at a rotor frequency; comprising the steps of:
    superimposing a test signal onto an input voltage applied to at least one winding of the stator of the motor, the test signal is at a frequency substantially equal to the rotor frequency; and
    varying the frequency of the test signal so as to sweep from a first frequency, which is less than the rotor frequency, to a second frequency which is greater than the rotor frequency;

whereupon the test signal combines with the input voltage so as to generate a composite current waveform, and deriving from zero cross points a signal indicative of the rotor speed.

14. The method as claimed in claim 13 wherein said rotor speed is determined from the rotational frequency of the rotor.

15. The method as claimed in claim 13 wherein the speed of a rotor is indicated when rotor impedance is indicated to be a maximum/infinite.

16. The method according to claim 13 wherein the superimposed test signal has an amplitude between 20-4 odB less than the voltage applied to each phase of the motor.

17. The method according to claim 13 wherein varying the frequency of the test signal includes applying a pulse width modulated signal.

* * * * *